(12) United States Patent (10) Patent No.: US 11,644,676 B2
Grabarnik et al. (45) Date of Patent: May 9, 2023

(54) IMAGE PROJECTOR COUPLED TO A LIGHT GUIDE OPTICAL ELEMENT

(71) Applicant: Lumus Ltd., Ness Ziona (IL)

(72) Inventors: Shimon Grabarnik, Rehovot (IL); Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 17/467,220

(22) Filed: Sep. 5, 2021

(65) Prior Publication Data

US 2022/0082838 A1 Mar. 17, 2022

Related U.S. Application Data

(60) Provisional application No. 63/076,971, filed on Sep. 11, 2020.

(51) Int. Cl.
*G02B 27/01* (2006.01)
*G02B 27/28* (2006.01)
(Continued)

(52) U.S. Cl.
CPC ....... *G02B 27/0172* (2013.01); *G02B 27/283* (2013.01); *G02B 27/30* (2013.01);
(Continued)

(58) Field of Classification Search
CPC .... H04N 9/315; H04N 9/3102; H04N 9/3141; H04N 9/3152; H04N 9/3155;
(Continued)

(56) References Cited

U.S. PATENT DOCUMENTS 2,748,659 A 6/1956 Geffcken et al.
2,795,069 A 6/1957 Hardesty
(Continued)

FOREIGN PATENT DOCUMENTS

CN 101542346 9/2009
CN 104503087 4/2015
(Continued)

OTHER PUBLICATIONS

Da-Yong et al., "A Continuous Membrance Micro Deformable Mirror Based on Anodic Bonding of Soi to Glass Water", Microsystem Technologies, Micro and Nanosystems Information Storage and Processing Systems, vol. 16, No. 10, May 20, 2010 pp. 1765-1769.
(Continued)

*Primary Examiner* — Sultan Chowdhury
(74) *Attorney, Agent, or Firm* — Mark M. Friedman

(57) ABSTRACT

An optical system includes a light-guide optical element (LOE) with a pair of parallel major external surfaces for guiding image light by internal reflection and a lateral coupling-in surface. An image projector includes a prism with a first surface associated with an illumination arrangement, a second surface associated with a reflective spatial light modulator (SLM), a third surface having a quarter-wave plate and a reflective collimating lens, and a fourth surface optically coupled to the coupling-in surface of the LOE. A polarizing beam splitter (PBS) is arranged within the prism to define a light path from the illumination arrangement via the SLM and the collimating lens to the coupling-in surface of the LOE. A fifth surface of the prism forms a continuation of one of the major external surfaces of the LOE.

10 Claims, 4 Drawing Sheets

(51) Int. Cl.
  *G02B 27/30* (2006.01)
  *H04N 9/31* (2006.01)
(52) U.S. Cl.
  CPC ......... *H04N 9/3102* (2013.01); *H04N 9/3152* (2013.01); *G02B 2027/0178* (2013.01)
(58) Field of Classification Search
  CPC .... G02B 6/002; G02B 6/0018; G02B 6/0026; G02B 6/0028; G02B 6/0053; G02B 27/017; G02B 27/0101; G02B 27/0172; G02B 27/0178; G02B 27/09; G02B 27/095; G02B 27/0955; G02B 27/0972; G02B 27/10; G02B 27/30; G02B 27/283
  See application file for complete search history.

(56) References Cited

U.S. PATENT DOCUMENTS

| | | | |
|---|---|---|---|
| 2,886,911 A | 5/1959 | Hardesty | |
| 3,491,245 A | 1/1970 | Hardesty | |
| 3,626,394 A | 12/1971 | Nelson et al. | |
| 3,667,621 A | 6/1972 | Barlow | |
| 3,677,621 A | 7/1972 | Smith | |
| 3,737,212 A | 6/1973 | Antonson et al. | |
| 3,802,763 A | 4/1974 | Cook et al. | |
| 3,857,109 A | 12/1974 | Pilloff | |
| 3,873,209 A | 3/1975 | Schinke et al. | |
| 3,940,204 A | 2/1976 | Withrington | |
| 4,084,883 A | 4/1978 | Eastman et al. | |
| 4,191,446 A | 3/1980 | Arditty et al. | |
| 4,241,382 A | 12/1980 | Daniel | |
| 4,309,070 A | 1/1982 | St. Leger Searle | |
| 4,331,387 A | 5/1982 | Wentz | |
| 4,516,828 A | 5/1985 | Steele | |
| 4,613,216 A | 9/1986 | Herbec et al. | |
| 4,662,717 A | 5/1987 | Yamada et al. | |
| 4,711,512 A | 12/1987 | Upatnieks | |
| 4,715,684 A | 12/1987 | Gagnon | |
| 4,775,217 A | 10/1988 | Ellis | |
| 4,798,448 A | 1/1989 | Van Raalte | |
| 4,805,988 A | 2/1989 | Dones | |
| 4,932,743 A | 6/1990 | Isobe et al. | |
| 4,978,952 A | 12/1990 | Irwin | |
| 5,033,828 A | 7/1991 | Haruta | |
| 5,076,664 A | 12/1991 | Migozzi | |
| 5,096,520 A | 3/1992 | Faris | |
| 5,157,526 A | 10/1992 | Kondo et al. | |
| 5,231,642 A | 7/1993 | Scifres et al. | |
| 5,301,067 A | 4/1994 | Bleier et al. | |
| 5,353,134 A | 10/1994 | Michel et al. | |
| 5,367,399 A | 11/1994 | Kramer | |
| 5,369,415 A | 11/1994 | Richard et al. | |
| 5,453,877 A | 9/1995 | Gerbe et al. | |
| 5,543,877 A | 8/1996 | Takashi et al. | |
| 5,555,329 A | 9/1996 | Kuper et al. | |
| 5,619,601 A | 4/1997 | Akashi et al. | |
| 5,650,873 A | 7/1997 | Gal et al. | |
| 5,680,209 A | 10/1997 | Maechler | |
| 5,724,163 A | 3/1998 | David | |
| 5,751,480 A | 5/1998 | Kitagishi | |
| 5,764,412 A | 6/1998 | Suzuki et al. | |
| 5,829,854 A | 11/1998 | Jones | |
| 5,883,684 A | 3/1999 | Millikan et al. | |
| 5,896,232 A | 4/1999 | Budd et al. | |
| 5,919,601 A | 7/1999 | Nguyen et al. | |
| 5,966,223 A | 10/1999 | Amitai et al. | |
| 5,982,536 A | 11/1999 | Swan | |
| 6,021,239 A | 2/2000 | Minami et al. | |
| 6,052,500 A | 4/2000 | Takano et al. | |
| 6,091,548 A | 7/2000 | Chen | |
| 6,144,347 A | 11/2000 | Mizoguchi et al. | |
| 6,185,015 B1 | 2/2001 | Silviu | |
| 6,490,104 B1 | 12/2002 | Gleckman et al. | |
| 6,829,095 B2 | 12/2004 | Amitai | |
| 7,751,122 B2 | 7/2010 | Amitai | |
| 7,778,508 B2 | 8/2010 | Hirayama | |
| 8,655,178 B2 | 2/2014 | Capron et al. | |
| 8,736,963 B2 | 5/2014 | Robbins et al. | |
| 8,743,464 B1 | 6/2014 | Amirparviz | |
| 8,760,762 B1 | 6/2014 | Kelly et al. | |
| 9,285,591 B1 | 3/2016 | Gupta et al. | |
| 9,805,633 B2 | 10/2017 | Zheng | |
| 10,437,066 B2 | 10/2019 | Dobschal | |
| 10,444,481 B2 | 10/2019 | Takahashi | |
| 10,480,725 B2 | 11/2019 | Streppel | |
| 10,480,772 B2 | 11/2019 | Forest | |
| 10,480,775 B2 | 11/2019 | Streppel | |
| 11,199,718 B2 * | 12/2021 | Koshihara | G02B 27/141 |
| 2001/0000124 A1 | 4/2001 | Joel et al. | |
| 2002/0015233 A1 | 2/2002 | Park | |
| 2002/0097762 A1 | 7/2002 | Yoshimura et al. | |
| 2002/0191297 A1 | 12/2002 | Gleckman et al. | |
| 2003/0007157 A1 | 1/2003 | Hulse et al. | |
| 2003/0020006 A1 | 1/2003 | Janeczko et al. | |
| 2003/0063042 A1 | 4/2003 | Friesem et al. | |
| 2003/0090439 A1 | 5/2003 | Spitzer et al. | |
| 2003/0169504 A1 | 9/2003 | Kaminsky et al. | |
| 2003/0197938 A1 | 10/2003 | Schmidt et al. | |
| 2003/0218718 A1 | 11/2003 | Moliton et al. | |
| 2004/0085649 A1 | 5/2004 | Repetto | |
| 2004/0137189 A1 | 7/2004 | Tellini et al. | |
| 2005/0012842 A1 | 1/2005 | Miyagawa et al. | |
| 2005/0018308 A1 | 1/2005 | Cassarly et al. | |
| 2005/0083565 A1 | 4/2005 | Yamazaki et al. | |
| 2005/0084210 A1 | 4/2005 | Cha | |
| 2005/0174641 A1 | 8/2005 | Greenberg | |
| 2005/0174658 A1 | 8/2005 | Long et al. | |
| 2005/0180687 A1 | 8/2005 | Amitai | |
| 2005/0265044 A1 | 12/2005 | Chen et al. | |
| 2006/0126182 A1 | 6/2006 | Levola | |
| 2006/0171046 A1 | 8/2006 | Recco et al. | |
| 2006/0268421 A1 | 11/2006 | Shimizu et al. | |
| 2007/0007157 A1 | 1/2007 | Buschmann et al. | |
| 2007/0035707 A1 | 2/2007 | Margulis | |
| 2007/0064310 A1 | 3/2007 | Mukawa et al. | |
| 2007/0070859 A1 | 3/2007 | Hirayama | |
| 2007/0086712 A1 | 4/2007 | Shani | |
| 2008/0009458 A1 | 4/2008 | Hirayama | |
| 2008/0094586 A1 | 4/2008 | Hirayama | |
| 2008/0106775 A1 | 5/2008 | Amitai et al. | |
| 2008/0151379 A1 | 6/2008 | Amitai | |
| 2008/0186604 A1 | 8/2008 | Amitai | |
| 2008/0198471 A1 | 8/2008 | Amitai | |
| 2008/0239422 A1 | 10/2008 | Noda | |
| 2008/0259429 A1 | 10/2008 | Kamm et al. | |
| 2008/0278812 A1 | 11/2008 | Amitai | |
| 2008/0285140 A1 | 11/2008 | Amitai | |
| 2009/0052046 A1 | 2/2009 | Amitai | |
| 2009/0052047 A1 | 2/2009 | Amitai | |
| 2009/0097127 A1 | 4/2009 | Amitai | |
| 2009/0122414 A1 | 5/2009 | Amitai | |
| 2009/0153437 A1 | 6/2009 | Aharoni | |
| 2009/0190222 A1 | 7/2009 | Simmonds et al. | |
| 2010/0020204 A1 | 1/2010 | Fleischer et al. | |
| 2010/0111472 A1 | 5/2010 | Dejong | |
| 2010/0171680 A1 | 7/2010 | Lapidot et al. | |
| 2010/0201128 A1 | 8/2010 | Bech et al. | |
| 2010/0202128 A1 | 8/2010 | Saccomanno | |
| 2010/0278480 A1 | 11/2010 | Vasylyev et al. | |
| 2010/0291489 A1 | 11/2010 | Moskovits et al. | |
| 2011/0000201 A1 | 1/2011 | Routley et al. | |
| 2011/0194163 A1 | 8/2011 | Shimizu et al. | |
| 2012/0039576 A1 | 2/2012 | Dangel et al. | |
| 2012/0147361 A1 | 6/2012 | Mochizuki et al. | |
| 2012/0179369 A1 | 7/2012 | Lapidot et al. | |
| 2012/0200938 A1 | 8/2012 | Totani et al. | |
| 2012/0206817 A1 | 8/2012 | Totani et al. | |
| 2013/0229717 A1 | 9/2013 | Amitai | |
| 2013/0276960 A1 | 10/2013 | Amitai | |
| 2013/0279017 A1 | 10/2013 | Amitai | |
| 2013/0321432 A1 | 12/2013 | Burns et al. | |
| 2013/0334504 A1 | 12/2013 | Thompson et al. | |
| 2013/0335975 A1 | 12/2013 | Park | |
| 2014/0003762 A1 | 1/2014 | Macnamara | |

(56) References Cited

U.S. PATENT DOCUMENTS

| | | |
|---|---|---|
| 2014/0043688 A1 | 2/2014 | Schrader et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0185142 A1 | 7/2014 | Gupta et al. |
| 2014/0226215 A1 | 8/2014 | Komatsu et al. |
| 2014/0232619 A1 | 8/2014 | Hiraide |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0160529 A1 | 6/2015 | Popovich et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0260992 A1 | 9/2015 | Luttmann et al. |
| 2015/0277127 A1 | 10/2015 | Amitai |
| 2015/0293360 A1 | 10/2015 | Amitai |
| 2015/0338655 A1 | 11/2015 | Sawada et al. |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0234485 A1 | 8/2016 | Robbins et al. |
| 2016/0274361 A1 | 9/2016 | Border et al. |
| 2016/0282622 A1 | 9/2016 | Hiraide |
| 2016/0341964 A1 | 11/2016 | Amitai |
| 2016/0349518 A1 | 12/2016 | Amitai et al. |
| 2017/0045743 A1 | 2/2017 | Dobschal et al. |
| 2017/0045744 A1 | 2/2017 | Amitai |
| 2017/0052376 A1 | 2/2017 | Amitai |
| 2017/0052377 A1 | 2/2017 | Amitai |
| 2017/0075119 A1 | 3/2017 | Schultz et al. |
| 2017/0242249 A1 | 8/2017 | Wall |
| 2017/0315358 A1 | 11/2017 | Masuda |
| 2017/0336636 A1 | 11/2017 | Amitai et al. |
| 2017/0343822 A1 | 11/2017 | Border et al. |
| 2017/0357095 A1 | 12/2017 | Amitai |
| 2017/0357100 A1* | 12/2017 | Ouderkirk .......... G02B 19/0028 |
| 2017/0363799 A1 | 12/2017 | Ofir et al. |
| 2017/0371160 A1 | 12/2017 | Schultz |
| 2018/0039082 A1 | 2/2018 | Amitai |
| 2018/0067315 A1 | 3/2018 | Amitai et al. |
| 2018/0157057 A1 | 6/2018 | Gelberg et al. |
| 2018/0210202 A1 | 7/2018 | Danziger |
| 2018/0267295 A1 | 9/2018 | Dalrymple et al. |
| 2018/0267317 A1 | 9/2018 | Amitai |
| 2018/0275384 A1 | 9/2018 | Danziger et al. |
| 2018/0284448 A1 | 10/2018 | Matsuki et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0033598 A1 | 1/2019 | Yang |
| 2019/0041646 A1 | 2/2019 | Amitai et al. |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0187482 A1 | 6/2019 | Lanman |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0029392 A1 | 9/2019 | Karam |
| 2019/0278086 A1 | 9/2019 | Ofir |
| 2019/0278160 A1 | 9/2019 | Lin et al. |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0081246 A1 | 3/2020 | Olkkonen et al. |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0225484 A1* | 7/2020 | Takagi ............... G02B 27/0172 |
| 2020/0241308 A1 | 7/2020 | Danziger et al. |
| 2020/0249481 A1 | 8/2020 | Danziger et al. |
| 2020/0278554 A1 | 9/2020 | Schultz et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033774 A1 | 2/2021 | Tanaka |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0149199 A1* | 5/2021 | Guan .................. G02B 5/04 |
| 2021/0149204 A1 | 5/2021 | Amitai et al. |
| 2021/0389591 A1* | 12/2021 | Lee .................... G02B 27/0093 |
| 2022/0004007 A1 | 1/2022 | Bhakta et al. |

FOREIGN PATENT DOCUMENTS

| | | |
|---|---|---|
| CN | 107238928 | 10/2017 |
| CN | 107272185 | 10/2017 |
| CN | 206649211 | 11/2017 |
| CN | 106842778 | 5/2019 |
| DE | 1422172 | 11/1970 |
| DE | 19725262 | 12/1998 |
| DE | 102013106392 | 12/2014 |
| DE | 102019205138 | 10/2019 |
| EP | 0365406 | 4/1990 |
| EP | 0380035 | 8/1990 |
| EP | 0399865 | 11/1990 |
| EP | 0543718 | 5/1993 |
| EP | 0566004 | 10/1993 |
| EP | 1158336 | 11/2001 |
| EP | 1180711 | 2/2002 |
| EP | 1326102 | 7/2003 |
| EP | 1385023 | 1/2004 |
| EP | 0770818 | 4/2007 |
| EP | 2530510 | 12/2012 |
| FR | 2496905 | 6/1982 |
| FR | 2638242 | 4/1990 |
| FR | 2721872 | 1/1996 |
| GB | 2220081 | 12/1989 |
| GB | 2272980 | 6/1994 |
| GB | 2278222 | 11/1994 |
| GB | 2278888 | 12/1994 |
| JP | 2001343608 | 12/2001 |
| JP | 2002539498 | 11/2002 |
| JP | 2003140081 | 5/2003 |
| JP | 2004145330 | 5/2004 |

(56) References Cited

FOREIGN PATENT DOCUMENTS

| | | |
|---|---|---|
| JP | 2004527801 | 9/2004 |
| JP | 2005084522 | 3/2005 |
| JP | 2006201637 | 8/2006 |
| JP | 2008053517 | 3/2008 |
| JP | 4394919 | 1/2010 |
| JP | 2011-028141 | 2/2011 |
| JP | 2012058404 | 3/2012 |
| JP | 2012198263 | 10/2012 |
| JP | 2016033867 | 3/2016 |
| WO | 9510106 | 4/1995 |
| WO | 9815868 | 4/1998 |
| WO | 9952002 | 10/1999 |
| WO | 0004407 | 1/2000 |
| WO | 0127685 | 4/2001 |
| WO | 0195025 | 12/2001 |
| WO | 02082168 | 10/2002 |
| WO | 03058320 | 7/2003 |
| WO | 2004109349 | 12/2004 |
| WO | 2006098097 | 9/2006 |
| WO | 2009009268 | 1/2009 |
| WO | 2011130720 | 10/2011 |
| WO | 2013065656 | 5/2013 |
| WO | 2017106873 | 6/2017 |
| WO | 2020157747 | 8/2020 |

OTHER PUBLICATIONS

Salter, P. S. and Booth, M. J. et al. "Designing and aligning optical systems incorporating Liquid crystal spatial light modulators (SLMs)", Department of Engineering, University of Oxford, vr1.0, doi: 10.5281/zenodo.4518992 (published online Feb. 12, 2020) Salter, P. S. and Booth, M. J. Feb. 12, 2020 (Feb. 12, 2020).

* cited by examiner

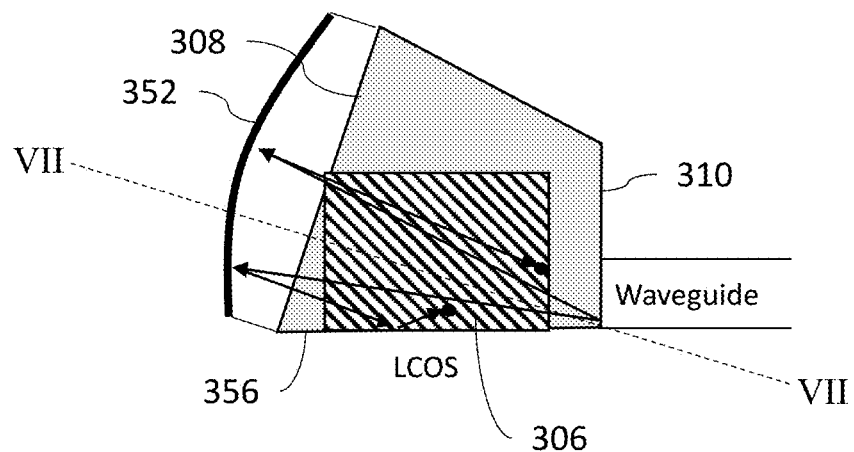
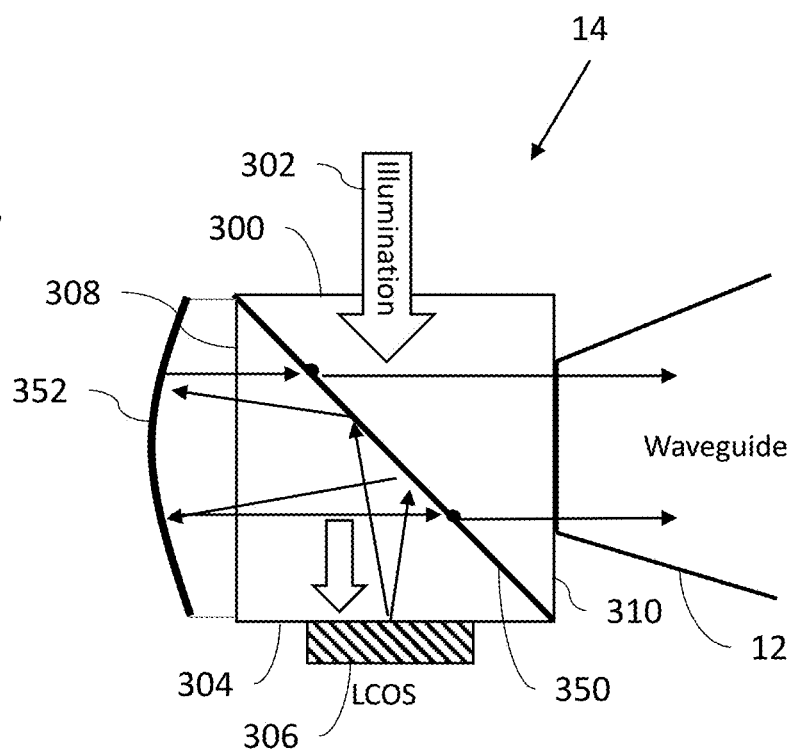

IMAGE PROJECTOR COUPLED TO A LIGHT GUIDE OPTICAL ELEMENT

FIELD AND BACKGROUND OF THE INVENTION

The present invention relates to optical systems and, in particular, it concerns an image projector coupled to a light-guide optical element (LOE) as part of a display system.

Many near-eye display systems include a transparent light-guide optical element (LOE) or "waveguide" placed before the eye of the user, which conveys an image within the LOE by internal reflection and then achieves optical aperture expansion in one or two dimensions and couples out the image by a suitable output coupling mechanism towards the eye of the user. The aperture expansion and output coupling mechanisms may be based on embedded partial reflectors or "facets", or may employ diffractive optical elements.

SUMMARY OF THE INVENTION

The present invention is an optical system.

According to the teachings of an embodiment of the present invention there is provided, an optical system comprising: (a) a light-guide optical element (LOE) having a pair of parallel major external surfaces for guiding image light by internal reflection at the major external surfaces, the LOE having a lateral coupling-in surface; and (b) an image projector comprising a prism having: (i) a first surface associated with an illumination arrangement; (ii) a second surface associated with a reflective spatial light modulator (SLM); (iii) a third surface having a quarter-wave plate and a reflective collimating lens; (iv) a fourth surface optically coupled to the coupling-in surface of the LOE; (v) a polarizing beam splitter (PBS) arranged within the prism so as to define a light path such that illumination from the illumination arrangement illuminates the SLM, and such that reflected image illumination from the SLM is collimated by the collimating lens and directed towards the coupling-in surface; and (vi) a fifth surface, non-parallel to all of the first, second, third and fourth surfaces, the fifth surface being coplanar with, and optically continuous with, one of the major external surfaces of the LOE, wherein part of the image illumination collimated by the collimating lens is internally reflected at the fifth surface prior to reaching the coupling-in surface.

According to a further feature of an embodiment of the present invention, the PBS is deployed to reflect illumination from the illumination arrangement towards the SLM, to transmit reflected image illumination reflected from the SLM towards the collimating lens, and to reflect collimated image illumination from the collimating lens towards the coupling-in surface.

According to a further feature of an embodiment of the present invention, the second surface and the third surface are obliquely angled to the fifth surface.

According to a further feature of an embodiment of the present invention, the second surface is parallel to the third surface.

According to a further feature of an embodiment of the present invention, the third surface forms an angle of between 50 degrees and 70 degrees with the fifth surface.

According to a further feature of an embodiment of the present invention, the SLM is a liquid-crystal on silicon (LCOS) chip.

According to a further feature of an embodiment of the present invention, the PBS is deployed to transmit illumination from the illumination arrangement towards the SLM, to reflect reflected image illumination from the SLM towards the collimating lens, and to transmit collimated image illumination from the collimating lens towards the coupling-in surface.

BRIEF DESCRIPTION OF THE DRAWINGS

The invention is herein described, by way of example only, with reference to the accompanying drawings, wherein:

FIG. 6 is a side view of an alternative implementation of the image projector of FIG. 2; and FIG. 7 is a schematic cross-sectional view taken along the line VII-VII in FIG. 6.

DESCRIPTION OF THE PREFERRED EMBODIMENTS

Certain embodiments of the present invention provide an optical system including an image projector coupled to a light-guide optical element (LOE).

Figure 1A:
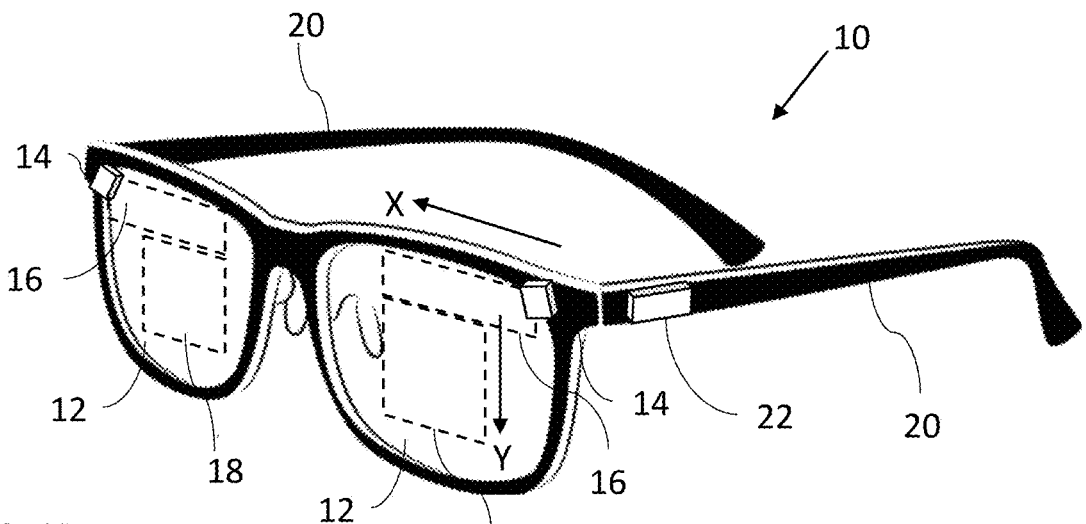
FIGS. 1A and 1B are schematic isometric views of an optical system implemented using a light-guide optical element (LOE), constructed and operative according to the teachings of the present invention, illustrating a top-down and a side-injection configuration, respectively.
Figure 1B:
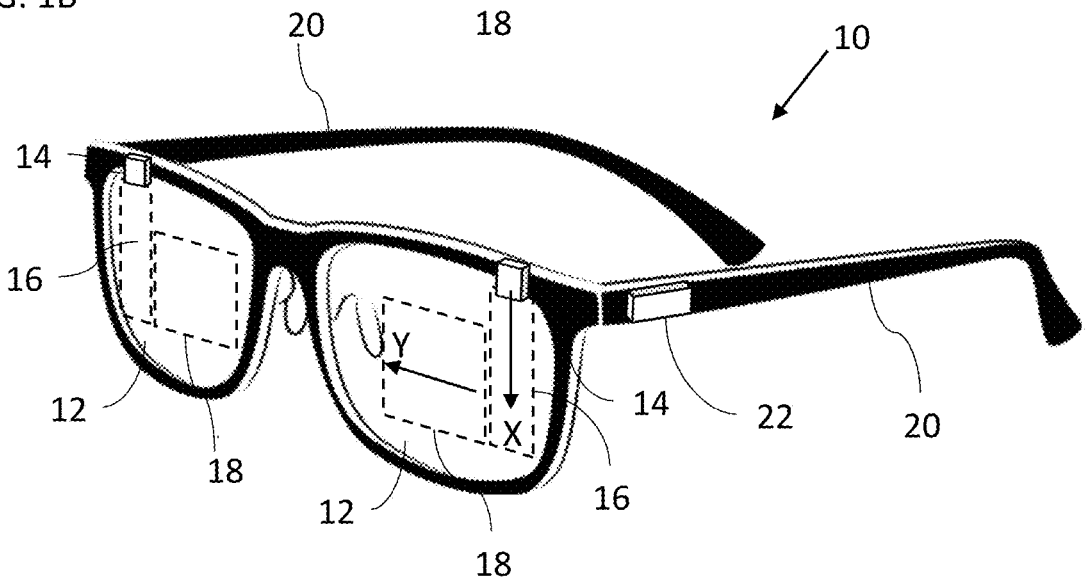

An exemplary implementation of a device in the form of a near-eye display, generally designated 10, employing an LOE 12 according to the teachings of an embodiment of the present invention, is illustrated schematically in FIGS. 1A and 1B. The near-eye display 10 employs a compact image projector (or "POD") 14 optically coupled so as to inject an image into LOE (interchangeably referred to as a "waveguide," a "substrate" or a "slab") 12 within which the image light is trapped in one dimension by internal reflection at a set of mutually-parallel planar external surfaces.

Figure 2:
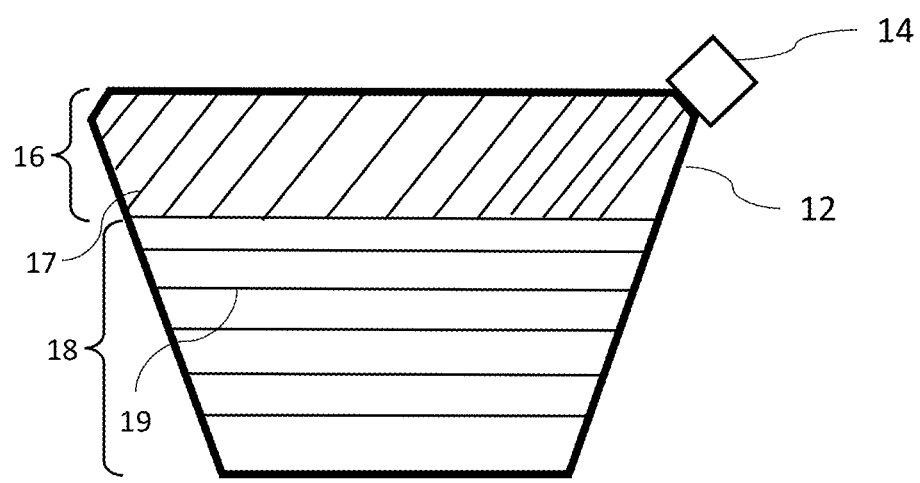
FIG. 2 is a schematic front view of an implementation of the LOE of FIG. 1A showing positioning of an image projector coupled to the LOE.

The LOE typically includes an arrangement for expanding the optical aperture of the injected image in one or two dimensions, and for coupling-out the image illumination towards the eye of the observer, typically based either on the use of internal partially-reflecting surfaces or on diffractive optical elements. In one non-limiting set of implementations further illustrated schematically in FIG. 2, the light injected into LOE 12 from image projector 14 impinges of a set of partially-reflecting surfaces (interchangeably referred to as "facets") 17 that are parallel to each other, and inclined obliquely to the direction of propagation of the image light, with each successive facet deflecting a proportion of the image light into a deflected direction, also trapped/guided by internal reflection within the substrate. This first set of facets 17 are not illustrated individually in FIGS. 1A and 1B, but are located in a first region of the LOE designated 16 and are shown schematically in FIG. 2. This partial reflection at successive facets achieves a first dimension of optical aperture expansion. In a first set of preferred but non-limiting examples of the present invention, the aforementioned set of facets 17 are orthogonal to the major external surfaces of the substrate. In this case, both the injected image and its conjugate undergoing internal reflection as it propagates within region 16 are deflected and become conjugate images propagating in a deflected direction. In an alternative set of preferred but non-limiting examples, the first set of partially-reflecting surfaces 17 are obliquely angled relative to the major external surfaces of the LOE. In the latter case, either the injected image or its conjugate forms the desired deflected image propagating within the LOE, while the other reflection may be minimized, for example, by employing angularly-selective coatings on the facets which render them relatively transparent to the range of incident angles presented by the image whose reflection is not needed.

The first set of partially-reflecting surfaces deflect the image illumination from a first direction of propagation trapped by total internal reflection (TIR) within the substrate to a second direction of propagation, also trapped by TIR within the substrate.

The deflected image illumination then passes into a second substrate region 18, which may be implemented as an adjacent distinct substrate or as a continuation of a single substrate, in which a coupling-out arrangement (either a further set of partially reflective facets 19 or a diffractive optical element) progressively couples out a proportion of the image illumination towards the eye of an observer located within a region defined as the eye-motion box (EMB), thereby achieving a second dimension of optical aperture expansion. The overall device may be implemented separately for each eye, and is preferably supported relative to the head of a user with the each LOE 12 facing a corresponding eye of the user. In one particularly preferred option as illustrated here, a support arrangement is implemented as an eye glasses frame with sides 20 for supporting the device relative to ears of the user. Other forms of support arrangement may also be used, including but not limited to, head bands, visors or devices suspended from helmets.

Reference is made herein in the drawings and claims to an X axis which extends horizontally (FIG. 1A) or vertically (FIG. 1B), in the general extensional direction of the first region of the LOE, and a Y axis which extends perpendicular thereto, i.e., vertically in FIG. 1A and horizontally in FIG. 1B.

In very approximate terms, the first LOE, or first region 16 of LOE 12, may be considered to achieve aperture expansion in the X direction while the second LOE, or second region 18 of LOE 12, achieves aperture expansion in the Y direction. It should be noted that the orientation as illustrated in FIG. 1A may be regarded as a "top-down" implementation, where the image illumination entering the main (second region) of the LOE enters from the top edge, whereas the orientation illustrated in FIG. 1B may be regarded as a "side-injection" implementation, where the axis referred to here as the Y axis is deployed horizontally. In the remaining drawings, the various features of certain embodiments of the present invention will be illustrated in the context of a "top-down" orientation, similar to FIG. 1A. However, it should be appreciated that all of those features are equally applicable to side-injection implementations, which also fall within the scope of the invention. In certain cases, other intermediate orientations are also applicable, and are included within the scope of the present invention except where explicitly excluded.

It will be appreciated that the near-eye display 10 includes various additional components, typically including a controller 22 for actuating the image projector 14, typically employing electrical power from a small onboard battery (not shown) or some other suitable power source. It will be appreciated that controller 22 includes all necessary electronic components such as at least one processor or processing circuitry to drive the image projector, all as is known in the art.

The teachings of the present invention relate primarily to the implementation of image projector 14 and the manner in which it is optically coupled to LOE 12. Enlarged detailed views of image projector 14 according to the teachings of certain embodiments of the present invention are shown in FIGS. 3-7.

Figure 3:
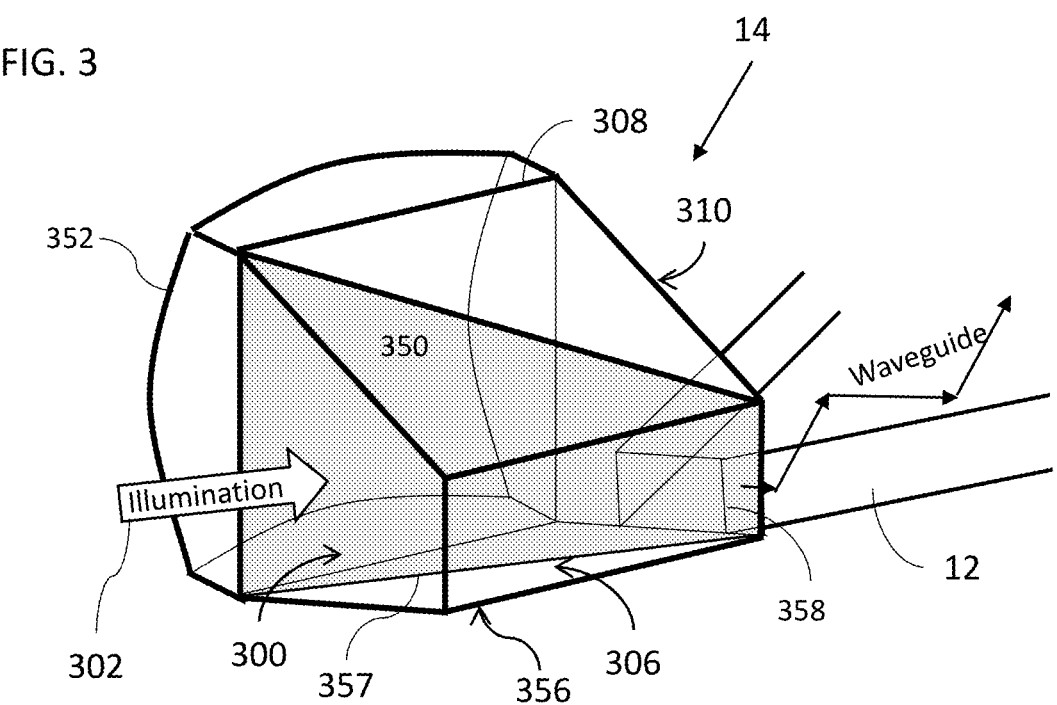
FIG. 3 is a schematic enlarged isometric view of the image projector of FIG. 2.
Figure 4:
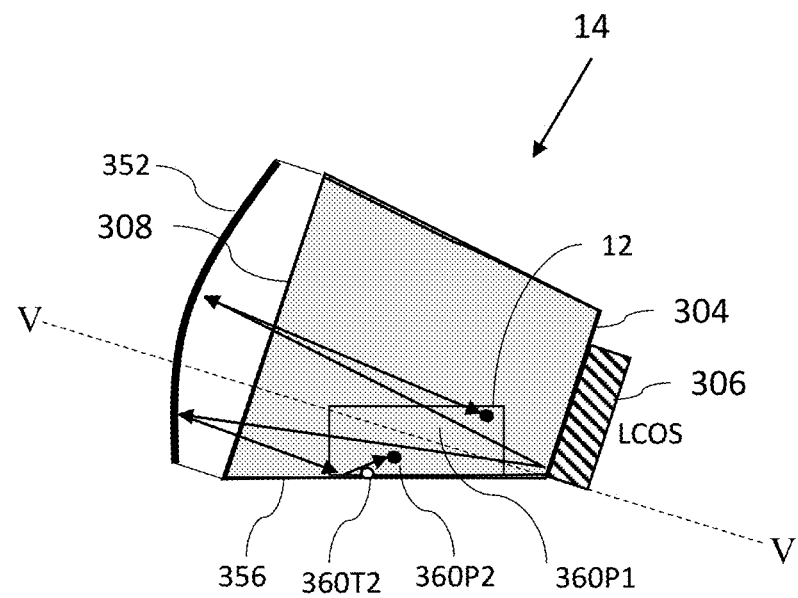
FIG. 4 is a side view of the image projector of FIG. 3.
Figure 5:
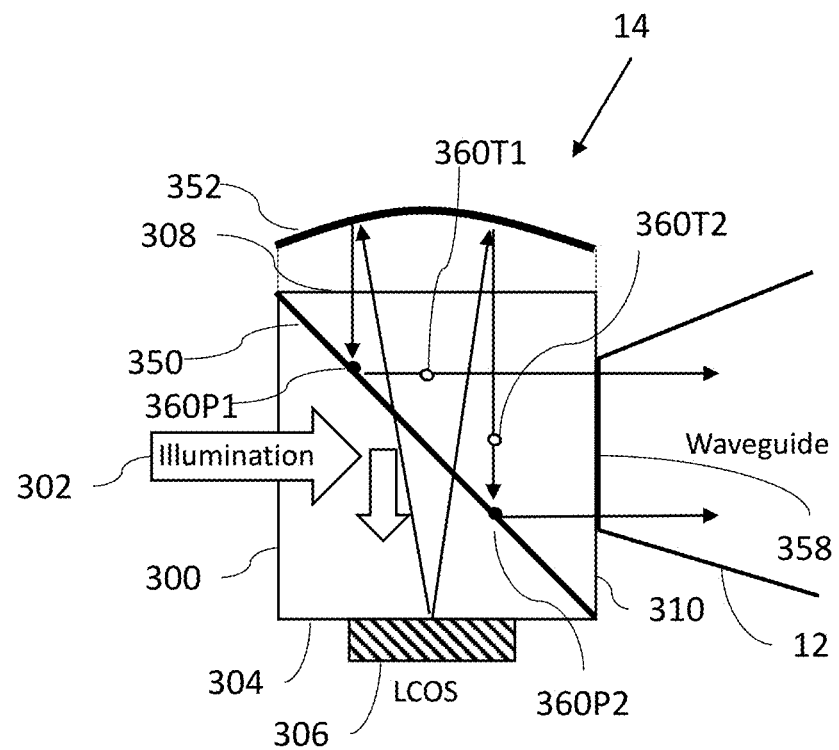
FIG. 5 is a schematic cross-sectional view taken along the line V-V in FIG. 4.

An implementation image projector 14 is illustrated in FIGS. 3-5. The image projector generates a collimated image, i.e., in which the light of each image pixel is a parallel beam, collimated to infinity, with an angular direction corresponding to the pixel position. The image illumination thus spans a range of angles corresponding to an angular field of view in two dimensions.

Minimizing optical size for an image projector based on a spatial light modulator (SLM), such as a liquid-crystal on silicon (LCOS) chip, includes combining three functions:

1. Illuminating the LCOS
2. Collimating the image reflected from the LCOS
3. Combining the coupling prism into the waveguide Combining all the above functions is particularly challenging where a short focal length is needed for image collimation. FIGS. 3-5 show how a double pass prism can combine the above functionalities by setting a PBS plane to be approximately perpendicular (90 degrees±20 degrees) to the waveguide plane. FIG. 3 shows an isometric view of such an optical arrangement. The illumination entrance is marked with a thick arrow. The PBS plane is a shaded plane marked 350 and the collimating reflective lens is 352. The bottom plane of the prism 356 is the plane where the TIR reflection takes place and is a continuation of the waveguide 12. The entrance 358 to the waveguide is at the side of the prism. It is apparent that the PBS plane 350 crosses the TIR plane 356 almost perpendicular (90 degrees±20 degrees) along line 357.

The top view of FIG. 5 shows the propagation of the beam inside the prism. The illumination is reflected by PBS 350 onto the LCOS. The reflected image from the LCOS (shown here only as arrows of beams from a single image pixel) reflects toward the reflecting lens 352 and passes through PBS 350 without reflections from the sides of the prism. The collimated beams from the LCOS are reflected by the PBS onto the waveguide entrance aperture 358. Some of these beams experience TIR reflection 360T1 after PBS reflection 360P1 while other of the beams experience TIR reflection 360T2 after PBS reflection 360P2 and yet others (not shown) do not experience TIR before reaching the waveguide entrance 358. The side view of FIG. 4 shows the same beams, but only as far as the PBS reflections, for clarity of illustration.

Thus, the image projector 14 illustrated here employs a prism with a first surface 300 associated with an illumination arrangement, represented schematically by arrow 302, a second surface 304 associated with reflective SLM 306, a third surface 308 having a quarter-wave plate and reflective collimating lens 352, and a fourth surface 310 optically coupled to the coupling-in surface (entrance) 358 of LOE 12. PBS 350 is arranged within the prism so as to define a light path such that illumination from the illumination arrangement 302 illuminates the SLM 306, and such that reflected image illumination from the SLM 306 is collimated by the collimating lens 352 and directed towards the coupling-in surface 358.

The prism of image projector 14 also has a fifth surface 356, which is non-parallel to all of the first, second, third and fourth surfaces 300, 304, 308 and 310. It is a particular feature of certain preferred implementations of the present invention that fifth surface 356 is coplanar with, and optically continuous with, one of the major external surfaces of the LOE 12. Part of the image illumination collimated by collimating lens 352 is preferably internally reflected at the fifth surface 356 prior to reaching the coupling-in surface 358.

In the implementation illustrated here, PBS 350 is deployed to reflect illumination from the illumination arrangement towards SLM 306, to transmit reflected image illumination reflected from the SLM towards the collimating lens 352, and to reflect collimated image illumination from the collimating lens towards the coupling-in surface 358.

Illumination source 302 may be any suitable illumination source known in the art, including but not limited to LEDs and laser diodes. The illumination source may include sources of different colors which can be switched rapidly in order to illuminate color separation images within a single frame period of a video in order to generate color images. The illumination source may include various optical components for directing and/or homogenizing the illumination, all as is known in the art. The illumination source also preferably includes a polarizer to ensure that the input illumination is S-polarized relative to PBS 350 so as to avoid leakage of the input illumination directly towards the waveguide.

As best seen in FIG. 4, second surface 304 and third surface 308 are preferably obliquely angled to fifth surface 356, and second surface 304 is preferably parallel to third surface 308. The optical axis of collimating lens 352 preferably defines an angle of inclination of the chief ray of the projected image relative to fifth surface 356 and the major external surfaces of LOE 12, thereby defining the inclination of the angle of injection of the image into the waveguide. This configuration is particularly effective for relatively shallow angles of injection. Preferred exemplary orientations of third surface 308 form an angle of between 50 degrees and 70 degrees with fifth surface 356, preferably corresponding to an inclination of the chief ray of the image at 20-40 degrees to the major external surfaces of the waveguide.

FIGS. 6 and 7 illustrate an alternative configuration of image projector 14, with equivalent components labeled similarly. In contrast to the reflection-transmission-reflection light path of the implementation of FIGS. 3-5 relative to the PBS 350, the implementation of FIGS. 6 and 7 employs a transmission-reflection-transmission light path relative to the PBS.

Specifically, as best seen in FIG. 7, PBS 350 is here deployed to transmit illumination from the illumination arrangement 302 towards the SLM 306, to reflect reflected image illumination from the SLM towards the collimating lens 352, and to transmit collimated image illumination from the collimating lens towards the coupling-in surface 358. In this case, a polarizer of illumination arrangement 302 is implemented to generate P-polarization relative to PBS 350. The inclination angle of PBS 350 and second face 304, and/or the orientation of the SLM 306 on the second face may be adjusted in order to correctly align the SLM with the optical axis of the collimating lens 352.

In all other respects, the structure and operation of the implementation of FIGS. 6 and 7 will be fully understood by analogy to that of FIGS. 3-5 described above.

It will be appreciated that the above descriptions are intended only to serve as examples, and that many other embodiments are possible within the scope of the present invention as defined in the appended claims.

What is claimed is:

1. An optical system comprising:
   (a) a light-guide optical element (LOE) having a pair of parallel major external surfaces for guiding image light by internal reflection at said major external surfaces, said LOE having a lateral coupling-in surface; and
   (b) an image projector comprising a prism having:
      (i) a first surface associated with an illumination arrangement;
      (ii) a second surface associated with a reflective spatial light modulator (SLM);
      (iii) a third surface having a quarter-wave plate and a reflective collimating lens;
      (iv) a fourth surface optically coupled to said coupling-in surface of said LOE;
      (v) a polarizing beam splitter (PBS) arranged within said prism so as to define a light path such that illumination from said illumination arrangement illuminates said SLM, and such that reflected image illumination from said SLM is collimated by said collimating lens and directed towards said coupling-in surface; and
      (vi) a fifth surface, non-parallel to all of said first, second, third and fourth surfaces, said fifth surface being coplanar with, and optically continuous with, one of said major external surfaces of said LOE, wherein part of said image illumination collimated by said collimating lens is internally reflected at said fifth surface prior to reaching said coupling-in surface.

2. The optical system of claim 1, wherein said PBS is deployed to reflect illumination from said illumination arrangement towards said SLM, to transmit reflected image illumination reflected from said SLM towards said collimating lens, and to reflect collimated image illumination from said collimating lens towards said coupling-in surface.

3. The optical system of claim 1, wherein said second surface and said third surface are obliquely angled to said fifth surface.

4. The optical system of claim 3, wherein said second surface is parallel to said third surface.

5. The optical system of claim 3, wherein said third surface forms an angle of between 50 degrees and 70 degrees with said fifth surface.

6. The optical system of claim 1, wherein said SLM is a liquid-crystal on silicon (LCOS) chip.

7. The optical system of claim 1, wherein said PBS is deployed to transmit illumination from said illumination arrangement towards said SLM, to reflect reflected image illumination from said SLM towards said collimating lens, and to transmit collimated image illumination from said collimating lens towards said coupling-in surface.

8. The optical system of claim 1, wherein said PBS lies in a plane within 20 degrees of perpendicular to said fifth surface.

9. The optical system of claim 1, wherein said PBS lies in a plane perpendicular to said fifth surface.

10. An optical system comprising:
   (a) a light-guide optical element (LOE) having a pair of parallel major external surfaces for guiding image light by internal reflection at said major external surfaces, said LOE having a lateral coupling-in surface; and (b) an image projector comprising a prism having:
- (i) a first surface associated with an illumination arrangement;
- (ii) a second surface associated with a reflective spatial light modulator (SLM);
- (iii) a third surface having a quarter-wave plate and a reflective collimating lens;
- (iv) a fourth surface optically coupled to said coupling-in surface of said LOE;
- (v) a polarizing beam splitter (PBS) surface arranged within said prism so as to define a light path such that illumination from said illumination arrangement illuminates said SLM, and such that reflected image illumination from said SLM is collimated by said collimating lens and directed towards said coupling-in surface; and
- (vi) a fifth surface, non-parallel to all of said first, second, third and fourth surfaces, said fifth surface being an external surface of said prism and coplanar with, and optically continuous with, one of said major external surfaces of said LOE, wherein part of said image illumination collimated by said collimating lens is internally reflected at said fifth surface prior to reaching said coupling-in surface.

\* \* \* \* \*